US008406474B2

(12) United States Patent
Duan et al.

(10) Patent No.: US 8,406,474 B2
(45) Date of Patent: Mar. 26, 2013

(54) METHOD AND APPARATUS FOR IDENTIFYING OBSTACLE IN IMAGE

(75) Inventors: Bobo Duan, Liaoning (CN); Wei Liu, Liaoning (CN); Huai Yuan, Liaoning (CN)

(73) Assignee: Neusoft Corporation, Shenyang, Liaoning (CN)

( * ) Notice: Subject to any disclaimer, the term of this patent is extended or adjusted under 35 U.S.C. 154(b) by 81 days.

(21) Appl. No.: 13/133,546

(22) PCT Filed: Apr. 30, 2009

(86) PCT No.: PCT/CN2009/071577
§ 371 (c)(1),
(2), (4) Date: Jun. 8, 2011

(87) PCT Pub. No.: WO2010/069167
PCT Pub. Date: Jun. 24, 2010

(65) Prior Publication Data
US 2011/0262009 A1      Oct. 27, 2011

(30) Foreign Application Priority Data

Dec. 15, 2008  (CN) .......................... 2008 1 0185833

(51) Int. Cl.
*G06K 9/00* (2006.01)
*H04N 5/225* (2006.01)
(52) U.S. Cl. ........................................ 382/107; 348/169
(58) Field of Classification Search .................. 382/103, 382/107, 236; 348/14.1, 154, 155, 169, 170, 348/171, 172, 208.1, 208.2, 208.16, 352, 348/407.1
See application file for complete search history.

(56) References Cited

U.S. PATENT DOCUMENTS

| 6,424,676 | B1 * | 7/2002 | Kono et al. | 375/240.16 |
| 7,446,798 | B2 * | 11/2008 | Comaniciu et al. | 348/148 |

FOREIGN PATENT DOCUMENTS

| CN | 1688157 A | 10/2005 |
| CN | 101123681 A | 2/2008 |
| CN | 101179725 A | 5/2008 |
| CN | 101419667 A | 4/2009 |
| JP | 10222679 A | 8/1998 |

OTHER PUBLICATIONS

Gideon P. Stein, et al., "A Robust Method for Computing Vehicle Ego-motion", Proceedings of the IEEE Intelligent Vehicles Symposium 2000, Oct. 3-5, 2000, pp. 362-368, Dearborn (MI), USA (in English).

(Continued)

*Primary Examiner* — Abolfazl Tabatabai
(74) *Attorney, Agent, or Firm* — Harness, Dickey & Pierce, P.L.C.

(57) ABSTRACT

A method for identifying barriers in images is disclosed. In the method, images of a current frame and N frame which is nearest to the current frame are obtained, the obtained images of the frames are divided in the same way, and the image of each frame obtains a plurality of divided block regions; the motion barrier confidence of each block region corresponding to the current frame and the N frame which is nearest to the current frame is calculated; whether each block region in the image of the current frame is decided successively according to the motion barrier confidence of each block region corresponding to the current frame and the N frame which is nearest to the current frame; the barriers in the images are determined according to each block region.

17 Claims, 3 Drawing Sheets

OTHER PUBLICATIONS

Qifa Ke and Takeo Kanade, "Transforming Camera Geometry to a Virtual Downward-Looking Camera: Robust Ego-Motion Estimation and Ground-Layer Detection", Proceedings of the 2003 IEEE Computer Society Conference on Computer Vision and Pattern Recognition (in English).

M. Bertozzi, et al., "Obstacle Detection for Start-Inhibit and Low Speed Driving", Proceedings of the IEEE Intelligent Vehicles Symposium 2005, Jun. 6-8, 2005, pp. 569-574, Parma, Italy (in English).

International Search Report (in English) and Written Opinion (in English) for PCT/CN2009/071577 (in English), mailed Sep. 24, 2009.

Takumi Yasumasu et al. "Detection of Dangerous Vehicles from Rear Scene." Journal C of Institute of Electrical Engineers of Japan, vol. 125, No. 4. pp. 570-575. Apr. 1, 2005. English-language summary provided by the Institute of Electrical Engineers of Japan at http://www2.iee.or.jp/ver2/honbu/14-magazine/log/2005/2005_04c_04.pdf. Abstract translation provided by Unitalen Attorneys At Law.

Koichiro Yamaguchi et al. "Obstacle Detection in Road Scene using Monocular Camera." Toyota Central R&D Labs., Inc. IPSJ SIG Technical Report. Nov. 18, 2005. pp. 69-76.

First Japanese Office Action regarding Application No. 2011-539877, dated Nov. 21, 2012. Translation provided by Unitalen Attorneys at Law.

* cited by examiner

METHOD AND APPARATUS FOR IDENTIFYING OBSTACLE IN IMAGE

This application claims the benefit of Chinese patent application No. 200810185833.4, titled "Method and Apparatus for Detecting Obstacle in Image", filed on Dec. 15, 2008 with State Intellectual Property Office, which is hereby incorporated by reference herein in its entirety.

FIELD OF THE INVENTION

The present invention relates to the field of obstacle detection, and in particular to a method and an apparatus for detecting an obstacle in an image.

BACKGROUND OF THE INVENTION

In the field, an obstacle normally refers to a three-dimensional object above the ground.

Nowadays, a common monocular-based obstacle detection method is based on motion compensation. The idea is that, when the road is flat and the lightning condition is fixed for a limited amount of time, for any of the points in the road plane, the pixel value of its image remains unchanged in consecutive frames. Assuming that each of the pixels of a previous frame corresponds to a point in the road plane, a hypothetical frame when the camera is moved is derivable, which can be calculated from the pixels of the previous frame according to camera motion parameters and imaging basics. Hence, the differences between the hypothetical frame and an actual one that is captured at the time are the sole result of those points that are not in the road plane. Pixels corresponding to the differences may be an obstacle above the ground.

The present method determines whether an obstacle is somewhere in an image based solely on the result from motion compensation. However, when the precision of motion parameters is low, or affected by image noise, the result from motion compensation may not be good, leading to something mistakenly detected as an obstacle.

SUMMARY OF THE INVENTION

Embodiments of the present invention provide a method and an apparatus for detecting an obstacle in an image, which may reduce error detection.

A method for detecting an obstacle in an image according to an embodiment of the present invention, includes:

acquiring a current frame and N previous frames that immediately precede the current frame, and partitioning the obtained frames in the same manner, so that each of the frames is partitioned into a plurality of blocks;

calculating a motion obstacle confidence for each of the blocks of the current frame and the N previous frames that immediately precede the current frame;

determining in an order, for each of the blocks of the current frame, whether the block is an obstacle, according to the motion obstacle confidences of the blocks of the current frame and the N previous frames that immediately precede the current frame; and determining the obstacle in the image according to each of the blocks.

The step of calculating a motion obstacle confidence for each of the blocks of the current frame may include:

i) acquiring a motion parameter, and generating a hypothetical current frame that corresponds to a previous frame at time n−k, where n>=2 and k>=1;

ii) for a block, calculating similarity between the block in the current frame and in the hypothetical frame, to obtain a first motion confidence C_M_A1;

iii) for the block, calculating similarity between the block in the current frame and in the previous frame at time n−k, to obtain a second motion confidence C_M_A2;

iv) for the block, if the first motion confidence C_M_A1 is greater than a first motion threshold, and if the ratio of the first motion confidence C_M_A1 to the second motion confidence C_M_A2 is greater than a second motion threshold, then the motion obstacle confidence C_M of the block of the current frame is 1, otherwise the motion obstacle confidence C_M of the block of the current frame is 0; and v) repeating steps ii) to iv), to obtain the motion obstacle confidence of each of the blocks.

The step of determining for each of the blocks of the current frame whether the block is an obstacle may include:

for a block, if the number of the motion obstacle confidences of the block in the current frame and in the N previous frames that are 1 is greater than a first amount threshold, then a total confidence C_Total of the block of the current frame is 1, otherwise the total confidence C_Total of the block is 0; and if the total confidence C_Total of the block of the current frame is 1, then the block is an obstacle, otherwise the block is not an obstacle.

Another method for detecting an obstacle in an image according to an embodiment of the present invention, includes:

acquiring a current frame and N previous frames that immediately precede the current frame, and partitioning the obtained frames in the same manner, so that each of the frames is partitioned into a plurality of blocks;

calculating a motion obstacle confidence and a characteristic obstacle confidence for each of the blocks of the current frame and the N previous frames that immediately precede the current frame;

determining in an order, for each of the blocks of the current frame, whether the block is an obstacle, according to the motion obstacle confidences and the characteristic obstacle confidence of the blocks of the current frame and the N previous frames that immediately precede the current frame; and determining the obstacle in the image according to each of the blocks.

The step of calculating a motion obstacle confidence for each of the blocks of the current frame may include:

i) acquiring a motion parameter, and generating a hypothetical current frame that corresponds to a previous frame at time n−k, where n>=2 and k>=1;

ii) for a block, calculating similarity between the block in the current frame and in the hypothetical frame, to obtain a first motion confidence C_M_A1;

iii) for the block, calculating similarity between the block in the current frame and in the previous frame at time n−k, to obtain a second motion confidence C_M_A2;

iv) for the block, if the first motion confidence C_M_A1 is greater than a first motion threshold, and if the ratio of the first motion confidence C_M_A1 to the second motion confidence C_M_A2 is greater than a second motion threshold, then the motion obstacle confidence C_M of the block of the current frame is 1, otherwise the motion obstacle confidence C_M of the block of the current frame is 0; and v) repeating steps ii) to iv), to obtain the motion obstacle confidence of each of the blocks.

The characteristic obstacle confidence may include a vertical feature-based characteristic obstacle confidence or a texture feature-based characteristic obstacle confidence.

The step of calculating a characteristic obstacle confidence for each of the blocks of the current frame based on their vertical features may include:

a) determining whether a block of the current frame has a vertical feature; and if so, the characteristic obstacle confidence C_F of the block of the current frame is 1, otherwise the characteristic obstacle confidence C_F of the block of the current frame is 0; and b) repeating step a), to obtain the characteristic obstacle confidence of each of the blocks.

The step of determining whether a block of the current frame has a vertical feature may include:

a01) calculating a vertical direction intensity of the block:

$$I_V = \sum_{i=0}^{N} \sum_{j=0}^{M} |c_{i,j} - c_{i,j-k}|, 1 \le k < j$$

where $c_{i,j}$ is the grayscale value of a pixel at row i and column j of the current frame, k is an integer, i, j∈R, with R being the block, N is the width of the image, and M is the height of the image; and a02) if the vertical direction intensity $I_v$ according to step a01) is greater than an intensity threshold, then it is determined that the block has a vertical feature, otherwise it is determined that the block does not have a vertical feature.

The step of determining for each of the blocks of the current frame whether the block is an obstacle may include:

for a block, if the number of the motion obstacle confidences of the block in the current frame and in the N previous frames that are 1 is greater than a first amount threshold, and if the number of the characteristic obstacle confidences of the block in the current frame and in the N previous frames that are 1 is greater than a second amount threshold, then a total confidence C_Total of the block of the current frame is 1, otherwise the total confidence C_Total of the block is 0; and if the total confidence C_Total of the block of the current frame is 1, then the block is an obstacle, otherwise the block is not an obstacle.

An apparatus for detecting an obstacle in an image according to an embodiment of the present invention, includes:

an image partitioning unit, adapted to acquire a current frame and N previous frames that immediately precede the current frame, and partition the obtained frames in the same manner, so that each of the frames is partitioned into a plurality of blocks;

a motion obstacle confidence calculating unit, adapted to calculate a motion obstacle confidence for each of the blocks of the current frame and the N previous frames that immediately precede the current frame;

a first block obstacle detecting unit, adapted to determine in an order, for each of the blocks of the current frame, whether the block is an obstacle, according to the motion obstacle confidences of the blocks of the current frame and the N previous frames that immediately precede the current frame; and an obstacle determining unit, adapted to determine the obstacle in the image according to each of the blocks.

The motion obstacle confidence calculating unit may include:

a hypothetical image generating unit, adapted to acquire a motion parameter, and generate a hypothetical current frame that corresponds to a previous frame at time n−k, where n>=2 and k>=1;

a first motion confidence calculating unit, adapted to calculate, for a block, similarity between the block in the current frame and in the hypothetical frame, to obtain a first motion confidence C_M_A1;

a second motion confidence calculating unit, adapted to calculate, for the block, similarity between the block in the current frame and in the previous frame at time n−k, to obtain a second motion confidence C_M_A2; and a motion obstacle confidence determining unit, adapted to determine, if the first motion confidence C_M_A1 is greater than a first motion threshold and if the ratio of the first motion confidence C_M_A1 to the second motion confidence C_M_A2 is greater than a second motion threshold, that the motion obstacle confidence C_M of the block of the current frame is 1, otherwise determine that the motion obstacle confidence C_M of the block of the current frame is 0.

The first block obstacle detecting unit may include:

a first total confidence determining unit, adapted to determine, for a block, if the number of the motion obstacle confidences of the block in the current frame and in the N previous frames that are 1 is greater than a first amount threshold, that a total confidence C_Total of the block of the current frame is 1, otherwise determine that the total confidence C_Total of the block is 0; and a first detecting unit, adapted to determine, if the total confidence C_Total of the block of the current frame is 1, that the block is an obstacle, otherwise determine that the block is not an obstacle.

Another apparatus for detecting an obstacle in an image according to an embodiment of the present invention, includes:

an image partitioning unit, adapted to acquire a current frame and N previous frames that immediately precede the current frame, and partition the obtained frames in the same manner, so that each of the frames is partitioned into a plurality of blocks;

a motion obstacle confidence calculating unit, adapted to calculate a motion obstacle confidence for each of the blocks of the current frame and the N previous frames that immediately precede the current frame;

a characteristic obstacle confidence calculating unit, adapted to calculate a characteristic obstacle confidence for each of the blocks of the current frame and the N previous frames that immediately precede the current frame;

a second block obstacle detecting unit, adapted to determine in an order, for each of the blocks of the current frame, whether the block is an obstacle, according to the motion obstacle confidences and the characteristic obstacle confidence of the blocks of the current frame and the N previous frames that immediately precede the current frame; and an obstacle determining unit, adapted to determine the obstacle in the image according to each of the blocks.

The motion obstacle confidence calculating unit may include:

a hypothetical image generating unit, adapted to acquire a motion parameter, and generate a hypothetical current frame that corresponds to a previous frame at time n−k, where n>=2 and k>=1;

a first motion confidence calculating unit, adapted to calculate, for a block, similarity between the block in the current frame and in the hypothetical frame, to obtain a first motion confidence C_M_A1;

a second motion confidence calculating unit, adapted to calculate, for the block, similarity between the block in the current frame and in the previous frame at time n−k, to obtain a second motion confidence C_M_A2; and a motion obstacle confidence determining unit, adapted to determine, if the first motion confidence C_M_A1 is greater than a first motion threshold and if the ratio of the first motion confidence C_M_A1 to the second motion confidence C_M_A2 is greater than a second motion threshold, that the motion obstacle confidence C_M of the block of the current frame is 1, otherwise determine that the motion obstacle confidence C_M of the block of the current frame is 0.

The characteristic obstacle confidence may include a vertical feature-based characteristic obstacle confidence, a vertical edge feature-based characteristic obstacle confidence, or a texture feature-based characteristic obstacle confidence.

When the characteristic obstacle confidence is based on a vertical feature, the characteristic obstacle confidence calculating unit may include:

a vertical feature determining unit, adapted to determine whether a block of the current frame has a vertical feature and notify a characteristic obstacle confidence determining unit of a determination result; and the characteristic obstacle confidence determining unit, adapted to determine, if it is notified of the block of the current frame having a vertical feature, that the characteristic obstacle confidence C_F of the block of the current frame is 1, otherwise determine that the characteristic obstacle confidence C_F of the block of the current frame is 0.

The second block obstacle detecting unit may include:

a second total confidence determining unit, adapted to determine, for a block, if the number of the motion obstacle confidences of the block in the current frame and in the N previous frames that are 1 is greater than a first amount threshold, and if the number of the characteristic obstacle confidences of the block in the current frame and in the N previous frames that are 1 is greater than a second amount threshold, that a total confidence C_Total of the block of the current frame is 1, otherwise determine that the total confidence C_Total of the block is 0; and a second detecting unit, adapted to determine, if it is notified of the total confidence C_Total of the block of the current frame being 1, that the block is an obstacle, otherwise determine that the block is not an obstacle.

Compared with the conventional method which is based solely on motion compensation, the method and apparatus for detecting an obstacle in an image according to the embodiments of the present invention use both an absolute level of motion compensation and a relative level of motion compensation, thereby reducing error detection and improving accuracy in detecting obstacles in images.

Compared with the conventional method which is based solely on motion compensation, the other method and apparatus for detecting an obstacle in an image according to the embodiments of the present invention use both an absolute level of motion compensation and a relative level of motion compensation, as well as a characteristic analysis strategy, which may further reduce error detection and improve accuracy in detecting obstacles in images.

BRIEF DESCRIPTION OF THE DRAWINGS

To describe the technical solution provided by the embodiments of the present invention more clearly, accompanying drawings of the embodiments are briefly discussed hereinafter. As can be seen, the drawings described herein represent only some embodiments of the present invention, and other drawings are derivable based on these drawings by those skilled in the art without inventive effects.

DETAILED DESCRIPTION OF THE INVENTION

The technical solutions provided by the embodiments of the present invention are described clearly and fully hereinafter in combination with the accompanying drawings of the embodiments of the present invention. As can be seen, the embodiments described herein are only some embodiments of the present invention, rather than all possible embodiments of the present invention. Any other embodiments obtained by those skilled in the art without inventive efforts based on the embodiments described herein shall fall within the scope of protection of the present invention.

A method for detecting an obstacle in an image according to an embodiment of the present invention, includes: acquiring a current frame and N previous frames that immediately precede the current frame, and partitioning the obtained frames in the same manner, so that each of the frames is partitioned into a plurality of blocks; calculating a motion obstacle confidence for each of the blocks of the current frame and the N previous frames that immediately precede the current frame; determining in an order, for each of the blocks of the current frame, whether the block is an obstacle, according to the motion obstacle confidences of the blocks of the current frame and the N previous frames that immediately precede the current frame; and determining the obstacle in the image according to each of the blocks. Compared with the conventional method which is based solely on motion compensation, the present invention uses both an absolute level of motion compensation and a relative level of motion compensation, thereby reducing error detection and improving accuracy in detecting obstacles in images.

Another method for detecting an obstacle in an image according to an embodiment of the present invention, includes: acquiring a current frame and N previous frames that immediately precede the current frame, and partitioning the obtained frames in the same manner, so that each of the frames is partitioned into a plurality of blocks; calculating a motion obstacle confidence and a characteristic obstacle confidence for each of the blocks of the current frame and the N previous frames that immediately precede the current frame; determining in an order, for each of the blocks of the current frame, whether the block is an obstacle, according to the motion obstacle confidences and the characteristic obstacle confidence of the blocks of the current frame and the N previous frames that immediately precede the current frame; and determining the obstacle in the image according to each of the blocks. Compared with the conventional method which is based solely on motion compensation, the present invention uses both an absolute level of motion compensation and a relative level of motion compensation, as well as a characteristic analysis strategy, which may reduce error detection, improve detection accuracy, and detect obstacles in images correctly.

Figure 1:
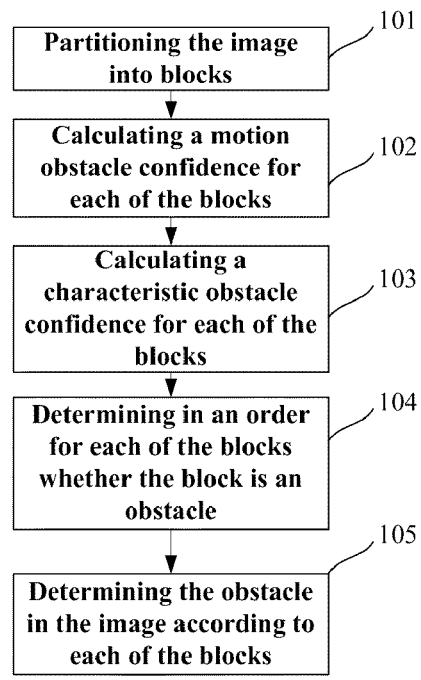
FIG. 1 is a flow chart of a method for detecting an obstacle in an image according to an embodiment of the present invention.

As shown in FIG. 1, a flow chart of a method for detecting an obstacle in an image according to an embodiment of the present invention, this embodiment uses both an absolute level of motion compensation and a relative level of motion compensation, as well as a characteristic analysis strategy. Specifically, the method includes:

Step 101, partitioning the image into blocks, specifically, acquiring a current frame and N previous frames that immediately precede the current frame, and partitioning the obtained frames in the same manner, so that each of the frames is partitioned into a plurality of blocks.

For example, firstly, a current frame $F_n$ (i.e., the frame at time n) and N previous frames that immediately precede the current frame are acquired from an image sequence, where n>=2, and the interval between frames is denoted as Δt.

Secondly, each of the frames is partitioned into a plurality of blocks. The blocks may have any shape that can fully divide the image, e.g., rectangle, or triangle. In this embodiment, the frames are partitioned into non-overlapping rectangular blocks with N×M pixels. Thus, for each of the frames, we get the same number of equally-sized rectangular blocks. There are no limits on specifically how the frames are divided, as long as they are partitioned into a plurality of rectangular blocks.

The specific value of N, i.e. the number of previous frames that immediately precede the current frame, may be determined according to actual needs. For instance, N may be determined as the number of frames captured during a period of time in which an object is present before the camera, according to the speed of movement of the object.

Step 102, calculating a motion obstacle confidence for each of the blocks of the current frame and the N previous frames that immediately precede the current frame.

The motion obstacle confidence refers to a motion compensation-based confidence on whether a block is an obstacle. Here, the motion compensation is slightly different from conventional motion compensation, as conventional motion compensation includes only a motion compensation-based absolute level, while the motion compensation in the present invention includes both a motion compensation-based absolute level and a motion compensation-based relative level.

It is appreciable that, the method to calculate a motion obstacle confidence for each of the blocks of the N previous frames that immediately precede the current frame, would be the same as the method to calculate a motion obstacle confidence for each of the blocks of the current frame. Therefore, only the method to calculate a motion obstacle confidence for each of the blocks of the current frame is described below, and the method for the N previous frames that immediately precede the current frame is omitted.

Figure 2:
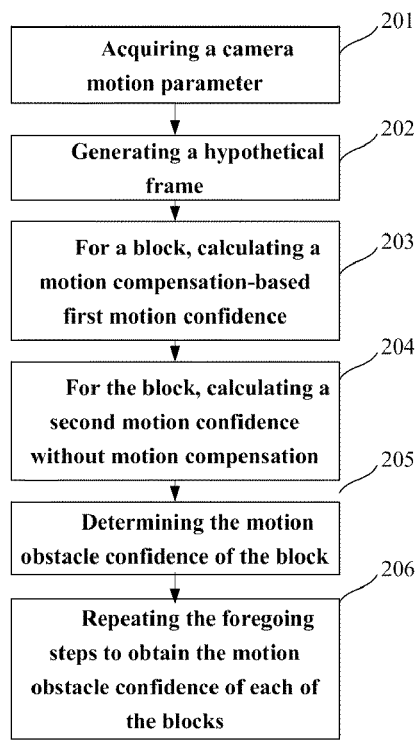
FIG. 2 is a flow chart of a method for calculating a motion obstacle confidence for each of the blocks of the current frame according to an embodiment of the present invention.

Now refer to FIG. 2, a flow chart of a method for calculating a motion obstacle confidence for each of the blocks of the current frame according to an embodiment of the present invention. Specifically, the method comprises:

Step 201, acquiring a camera motion parameter.

The camera motion parameter may be obtained via a sensor, e.g., a speed sensor, or a gyroscope sensor, or may be calculated from the image sequence, e.g., estimated by an optical flow method, a structure from motion (SFM) method, or a feature point detection-based or direct method. For example, document 1 "A robust method for computing vehicle ego-motion" uses a direct method to estimate motion parameters, and document 2 "Transforming camera geometry to a virtual downward-looking camera: robust ego-motion estimation and ground-layer detection" uses a modified direct method to obtain motion parameters. In this embodiment of the present invention, the camera motion parameter is estimated using the direct method of document 1.

Figure 3:
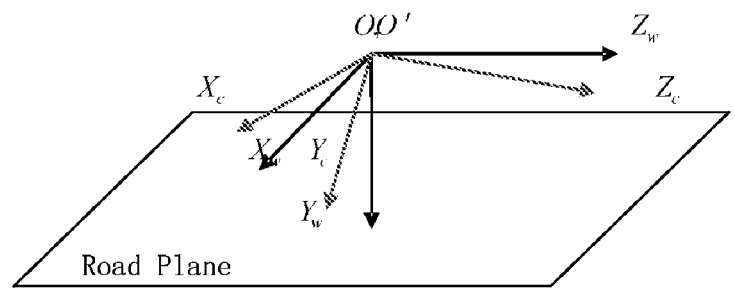
FIG. 3 is a diagram illustrating the relationship between the defined world coordinate system and a camera coordinate system from a previous frame according to an embodiment of the present invention.

In the embodiment of the present invention, we assume that the origin of the world coordinate system [O; $X_w$, $Y_w$, $Z_w$] coincide with the origin of the camera coordinate system [O'; $X_c$, $Y_c$, $Z_c$] from a previous frame, and a rotational angle may be present between their axes. The $Z_w$ axis of the world coordinate system is parallel to the road plane, and the $Y_w$ axis is perpendicular to the road plane, as shown in FIG. 3.

According to the road plane assumption, the camera motion parameter m is given by m={$t_x$, $t_z$, $\omega_y$}, that is, a translation along the $X_w$, $Z_w$ axes, and a rotation around the $Y_w$ axis.

Figure 4:
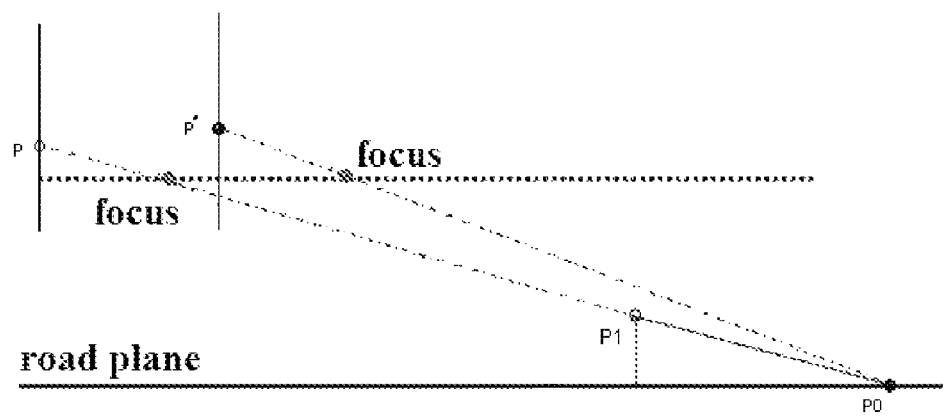
FIG. 4 is a diagram illustrating a hypothetical current frame according to an embodiment of the present invention.

Step 202, generating a hypothetical current frame that corresponds to a previous frame at time n−k, where n>=2 and k>=1;

The hypothetical frame refers to, assuming that each of the pixels of a previous frame (at time n−k, according to this embodiment) is an image of a point in the road plane (where $Y_w$=camera height), a frame formed by the new images of the points in the road plane with the camera moved to a new location, as shown in FIG. 4. The method for generating the hypothetical frame with the new camera location is described hereinafter, with the example of a pixel P in the previous frame.

Assuming that the pixel P in the previous frame is an image of a point $P_0$ in the road plane (actually, an image of a point $P_1$ of a three-dimensional object), when the camera is moved, the point $P_0$ will have an image P' that is in the hypothetical current frame and corresponds to the pixel P, that is, the pixel P' is to have the grayscale value of the pixel P. According to the same principle, a correspondence relationship between other pixels in the hypothetical current frame and the pixels in the previous frame can be derived, thereby obtaining the hypothetical current frame with the new camera location.

How to calculate coordinates of the pixel P' in the hypothetical frame is described below.

For example, a pixel P(r, c) in the previous frame, which is an image of a point $P_0(X_W, Y_W, Z_W)$ in the road plane, where r, c are the row coordinate and the column coordinate, respectively.

According to the camera imaging equation (which may also be known as video camera imaging equation), world coordinates ($X_w$, $Y_w$, $Z_w$) of the point $P_0$ are given by:

$$Z_c \begin{bmatrix} r \\ c \\ 1 \end{bmatrix} = \begin{bmatrix} \alpha_x & 0 & u_0 & 0 \\ 0 & \alpha_y & v_0 & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix} \quad (1)$$

where $\alpha_x$, $\alpha_y$, $u_0$, $v_0$ are internal parameters of the camera that can be obtained by calibration of the camera;

$t=[T_x, T_y, T_z]^T$ is a translational vector, with $T_x$, $T_y$, $T_z$ representing the location of the origin of the camera coordinate system in the world coordinate system and being external parameters of the camera that can be obtained during installation of the camera;

$$R = \begin{pmatrix} \cos\gamma\cos\beta & \cos\gamma\sin\beta\sin\alpha - \sin\gamma\cos\alpha & \cos\gamma\sin\beta\cos\alpha + \sin\gamma\sin\alpha \\ \sin\gamma\cos\beta & \cos\alpha\cos\gamma + \sin\gamma\sin\beta\sin\alpha & \sin\gamma\sin\beta\cos\alpha - \cos\gamma\sin\alpha \\ -\sin\beta & \cos\beta\sin\alpha & \cos\beta\cos\alpha \end{pmatrix}$$

is a rotational matrix, with $\alpha$, $\beta$, $\gamma$ representing rotation angles of the camera coordinate system around the X, Y, Z axes of the world coordinate system respectively and being external parameters of the camera that can be obtained during installation of the camera;

known: $Y_W$=camera height; and P(r, c), coordinates of the pixel.

By solving the equation (1), $X_W$, $Z_W$ and $Z_c$ can be obtained, with $Z_c$ being the Z-axis coordinate of P in the camera coordinate system.

Using the obtained motion parameter m={$t_x$, $t_z$, $\omega_y$}, post-movement coordinates of the origin of the camera coordinate system in the world coordinate system are given by: $T_x+t_x$, $T_y$, $T_z+t_z$, and the rotation angles of the camera coordinate system around the x, y, z axes of the world coordinate system become $\alpha$, $\beta+\omega_y$, $\gamma$. According to the updated rotational matrix and translational matrix of the camera and the obtained world coordinates ($X_w$, $Y_w$, $Z_w$) of $P_0$, by solving the camera imaging equation (1) whose right side is known, the unknown on the left side, i.e., coordinates of the image P' of the point $P_0$ in the hypothetical frame, can be obtained. Specifically, based on the transformation above, all the pixels in a previous frame $F_{n-k}$ can be moved according to the motion parameter, to generate a new hypothetical frame F'$_n$. Assuming no noise and planeness of the movement, the plane region in the hypothetical frame shall be consistent with the plane region in the current frame $F_n$, while the non-plane regions are different. This principle will be used below to determine the confidence on whether a block is a three-dimensional object.

Step 203, for a block, calculating similarity between the block in the current frame and in the hypothetical current frame that corresponds to a previous frame at time n−k, as a motion compensation-based first motion confidence C_M_A1.

It should be noted that, the similarity between the current frame and the hypothetical frame is referred as the first motion confidence C_M_A1, which is actually an absolute level of motion compensation; the similarity between the current frame and the actual frame at time n−k is referred as a second motion confidence C_M_A2, which is actually without motion compensation; and the ratio of the first motion confidence C_M_A1 to the second motion confidence C_M_A2 is actually a relative level of motion compensation.

Specifically, step 203 includes: for each of the pixels in a block of $F_n$, finding a pixel having the same coordinates in the hypothetical frame, and calculating similarity between the block in the current frame and in the hypothetical current frame based on the value of the corresponding pixel, to obtain the first motion confidence C_M_A1 on whether the block is an obstacle. A normalized correlation (NC) may be used as the similarity:

$$NC = \frac{\sum_{i=1}^{N}\sum_{j=1}^{M} X(i,j) \times X'(i,j)}{\sqrt{\sum_{i=1}^{N}\sum_{j=1}^{M} X^2(i,j) \times \sum_{i=1}^{N}\sum_{j=1}^{M} X'^2(i,j)}} \quad (3)$$

where the size of the block is N*M, X(i, j) is the grayscale value of the pixel (i, j) in $F_n$, and X'(i, j) is the grayscale value of the pixel (i, j) in the hypothetical frame F'$_n$ of $F_n$.

Step 204, for the block, calculating similarity between the block in the current frame and in the previous frame at time n−k, as a second motion confidence C_M_A2 without motion compensation.

Specifically, for each of the pixels in a block of $F_n$, a pixel having the same coordinates in $F_{n-k}$ is found, and similarity between the block in the current frame and the previous frame at time n−k is calculated based on the values of the pixel pairs, to obtain the second motion confidence C_M_A2 on whether the block is an obstacle. A normalized correlation (NC) may be used as the similarity:

$$NC = \frac{\sum_{i=1}^{N}\sum_{j=1}^{M} X(i,j) \times X''(i,j)}{\sqrt{\sum_{i=1}^{N}\sum_{j=1}^{M} X^2(i,j) \times \sum_{i=1}^{N}\sum_{j=1}^{M} X''^2(i,j)}} \quad (4)$$

where the size of the block is N*M, X(i, j) is the grayscale value of the pixel (i, j) in $F_n$, and X''(i, j) is the grayscale value of the pixel (i, j) in the previous frame at time n−k F''$_n$.

Step 205, determining the motion obstacle confidence C_M.

Specifically, if the first motion confidence C_M_A1 is greater than a first motion threshold, and if the ratio of the first motion confidence C_M_A1 to the second motion confidence C_M_A2 is greater than a second motion threshold, then the motion obstacle confidence C_M of the block of the current frame is 1, otherwise the motion obstacle confidence C_M of the block of the current frame is 0.

That is, the motion obstacle confidence C_M above is obtained based on an absolute level of motion compensation (when C_M_A1 is greater that the first motion threshold) and a relative level of motion compensation (when the ratio of C_M_A1 to C_M_A2 is greater than the second motion threshold).

It should be noted that, "the ratio of the first motion confidence C_M_A1 to the second motion confidence C_M_A2" is a broad term, which can be interpreted as: C_M_A1/C_M_A2, or (C_M_A1−C_M_A2)/(1−C_M_A2), or other forms.

Step 206, repeating the steps 203~205, to obtain the motion obstacle confidence of each of the blocks.

Step 103, calculating a characteristic obstacle confidence C_F for each of the blocks of the current frame and the N previous frames that immediately precede the current frame.

The characteristic obstacle confidence include a vertical feature-based characteristic obstacle confidence, a vertical edge feature-based characteristic obstacle confidence, or a texture feature-based characteristic obstacle confidence.

The method for calculating the characteristic obstacle confidence C_F is described below with the example of the vertical feature.

Step a, determining whether a block of the current frame has a vertical feature; and if so, the characteristic obstacle confidence C_F of the block of the current frame is 1, otherwise the characteristic obstacle confidence C_F of the block of the current frame is 0. Specifically, the step of determining whether a block of the current frame has a vertical feature includes:

a01) calculating a vertical direction intensity of $I_v$ the block;

$$I_V = \sum_{i=0}^{N} \sum_{j=0}^{M} |c_{i,j} - c_{i,j-k}|, 1 \leq k < j$$

where $c_{i,j}$ is the grayscale value of a pixel at row i and column j of the current frame, k is an integer, i, j∈R, with R being the block, N is the width of the image, and M is the height of the image; and a02) if the vertical direction intensity $I_v$ according to step a01) is greater than an intensity threshold T, namely, $I_v$>T, then it is determined that the block has a vertical feature, otherwise it is determined that the block does not have a vertical feature.

Step b, repeating step a, to obtain the characteristic obstacle confidence of each of the blocks.

Step 104, determining in an order, for each of the blocks of the current frame, whether the block is an obstacle, according to the motion obstacle confidences and the characteristic obstacle confidence of the blocks of the current frame and the N previous frames that immediately precede the current frame.

Specifically, for a block, assuming that the motion obstacle confidences of the block in the N previous frames are $C\_M_t$, $C\_M_{t-1}, \ldots, C\_M_{t-N-1}$, we calculate the number Sum_M of the motion obstacle confidences that are 1;

assuming that the character obstacle confidences of the block in the N previous frames are $C\_F_t, C\_F_{t-1}, C\_F_{t-N-1}$, we calculate the number Sum_F of the characteristic obstacle confidences that are 1;

if Sum_M is greater than a first amount threshold S_M_Limit, and if Sum_F is greater than a second amount threshold C_F_Limit, then a total confidence C_Total is 1, otherwise the total confidence C_Total is 0.

If the total confidence C_Total of the block in the current frame is 1, then the block is an obstacle, otherwise the block is not an obstacle.

That is, for a block, if the number of the motion obstacle confidences of the block in the current frame and in the N previous frames that are 1 is greater than a first amount threshold, and if the number of the characteristic obstacle confidences of the block in the current frame and in the N previous frames that are 1 is greater than a second amount threshold, then the total confidence C_Total of the block of the current frame is 1, otherwise the total confidence C_Total of the block is 0. If the total confidence C_Total of the block of the current frame is 1, then the block is an obstacle, otherwise the block is not an obstacle.

Step 105, determining the obstacle in the image according to each of the blocks.

Specifically, when it is determined for each of the blocks whether the block is an obstacle, by synthesizing all the results, the obstacle in the image can be obtained.

It can be seen that, compared with the conventional method which is based solely on motion compensation, the method for detecting an obstacle in an image according to FIG. 1 use both an absolute level of motion compensation and a relative level of motion compensation, as well as a characteristic analysis strategy, which may reduce error detection, improve detection accuracy, and detect obstacles in images correctly.

The embodiment shown in FIG. 1 is a preferred embodiment. In practice, another method may use only motion compensation (including the absolute level and the relative level), without the characteristic analysis-based compensation, which may also reduce error detection. This method may have steps that are similar to those shown in FIG. 1, however, step 103 is not performed, and step 104 is modified into: determining in an order, for each of the blocks of the current frame, whether the block is an obstacle, according to the motion obstacle confidences of the blocks of the current frame and the N previous frames that immediately precede the current frame. And the step of determining for each of the blocks of the current frame whether the block is an obstacle includes:

Specifically, for a block, assuming that the motion obstacle confidences of the block in the N previous frames are $C\_M_t$, $C\_M_{t-1}, \ldots, C\_M_{t-N-1}$, we calculate the number Sum_M of the motion obstacle confidences that are 1; if Sum_M is greater than a first amount threshold S_M_Limit, then a total confidence C_Total is 1, otherwise the total confidence C_Total is 0.

If the total confidence C_Total of the block in the current frame is 1, then the block is an obstacle, otherwise that block is not an obstacle.

That is, for a block, if the number of the motion obstacle confidences of the block in the current frame and in the N previous frames that are 1 is greater than a first amount threshold, then the total confidence C_Total of the block of the current frame is 1, otherwise the total confidence C_Total of the block is 0. If the total confidence C_Total of the block of the current frame is 1, then the block is an obstacle, otherwise the block is not an obstacle.

Figure 5:
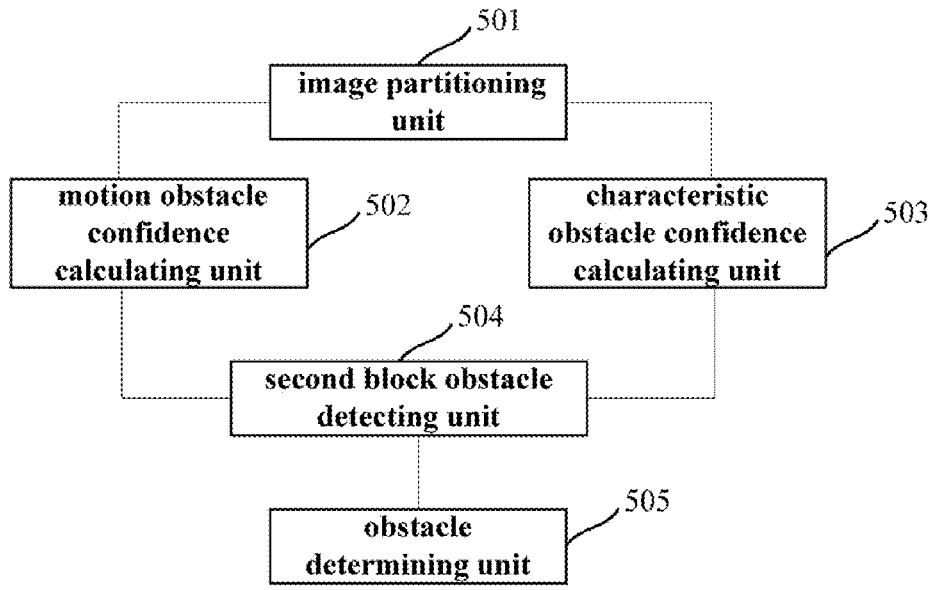
FIG. 5 is a structural diagram of an apparatus for detecting an obstacle in an image according to an embodiments of the present invention.

As shown in FIG. 5, the embodiments of the present invention also provide an apparatus for detecting an obstacle in an image, which corresponds to the embodiment shown in FIG. 1. The apparatus includes: an image partitioning unit 501, a motion obstacle confidence calculating unit 502, a characteristic obstacle confidence calculating unit 503, a second block obstacle detecting unit 504 and an obstacle determining unit 505.

The image partitioning unit 501 is adapted to acquire a current frame and N previous frames that immediately precede the current frame, and partition the obtained frames in the same manner, so that each of the frames is partitioned into a plurality of blocks.

The motion obstacle confidence calculating unit 502 is adapted to calculate a motion obstacle confidence for each of the blocks of the current frame and the N previous frames that immediately precede the current frame.

The characteristic obstacle confidence calculating unit 503 is adapted to calculate a characteristic obstacle confidence for each of the blocks of the current frame and the N previous frames that immediately precede the current frame. The characteristic obstacle confidence may include a vertical feature-based characteristic obstacle confidence, a vertical edge feature-based characteristic obstacle confidence, or a texture feature-based characteristic obstacle confidence.

The second block obstacle detecting unit 504 is adapted to determine in an order, for each of the blocks of the current frame, whether the block is an obstacle, according to the motion obstacle confidences and the characteristic obstacle confidence of the blocks of the current frame and the N previous frames that immediately precede the current frame.

The obstacle determining unit 505 is adapted to determine the obstacle in the image according to each of the blocks.

The motion obstacle confidence calculating unit 502 above may further include: a hypothetical image generating unit, a first motion confidence calculating unit, a second motion confidence calculating unit and a motion obstacle confidence determining unit.

The hypothetical image generating unit is adapted to acquire a motion parameter, and generate a hypothetical current frame that corresponds to a previous frame at time n–k, where n>=2 and k>=1.

The first motion confidence calculating unit is adapted to calculate, for a block, similarity between the block in the current frame and in the hypothetical frame, to obtain a first motion confidence C_M_A1.

The second motion confidence calculating unit is adapted to calculate, for the block, similarity between the block in the current frame and in the previous frame at time n–k, to obtain a second motion confidence C_M_A2.

The motion obstacle confidence determining unit is adapted to determine, if the first motion confidence C_M_A1 is greater than a first motion threshold and if the ratio of the first motion confidence C_M_A1 to the second motion confidence C_M_A2 is greater than a second motion threshold, that the motion obstacle confidence C_M of the block of the current frame is 1, otherwise determine that the motion obstacle confidence C_M of the block of the current frame is 0.

When the characteristic obstacle confidence is based on a vertical feature, the characteristic obstacle confidence calculating unit 503 may include a vertical feature determining unit and a characteristic obstacle confidence determining unit.

The vertical feature determining unit is adapted to determine whether a block of the current frame has a vertical feature and notify a characteristic obstacle confidence determining unit of a determination result.

The characteristic obstacle confidence determining unit is adapted to determine, if it is notified of the block of the current frame having a vertical feature, that the characteristic obstacle confidence C_F of the block of the current frame is 1, otherwise determine that the characteristic obstacle confidence C_F of the block of the current frame is 0.

The second block obstacle detecting unit 504 above may include: a second total confidence determining unit and a second detecting unit.

The second total confidence determining unit is adapted to determine, for a block, if the number of the motion obstacle confidences of the block in the current frame and in the N previous frames that are 1 is greater than a first amount threshold, and if the number of the characteristic obstacle confidences of the block in the current frame and in the N previous frames that are 1 is greater than a second amount threshold, that a total confidence C_Total of the block of the current frame is 1, otherwise determine that the total confidence C_Total of the block is 0.

The second detecting unit is adapted to determine, if it is notified of the total confidence C_Total of the block of the current frame being 1, that the block is an obstacle, otherwise determine that the block is not an obstacle.

Figure 6:
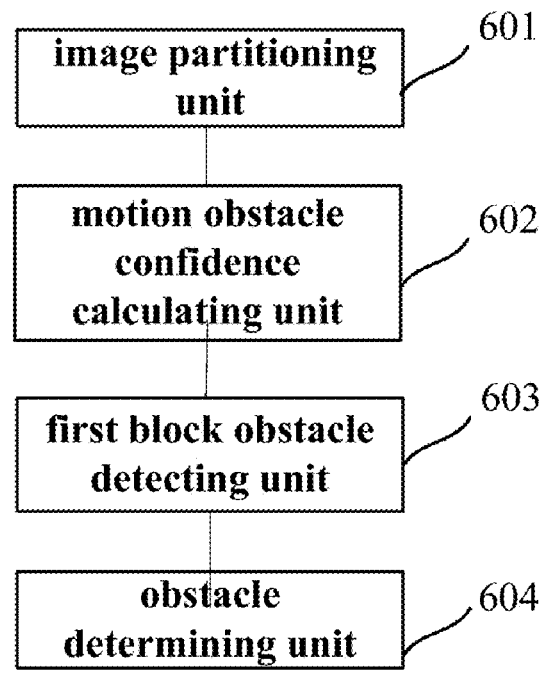
FIG. 6 is a structural diagram of another apparatus for detecting an obstacle in an image according to an embodiment of the present invention.

As shown in FIG. 6, the embodiments of the present invention also provide an apparatus for detecting an obstacle in an image. Differing from the embodiment of FIG. 5, this apparatus does not include the characteristic obstacle confidence calculating unit 503. That is, the apparatus of FIG. 6 includes: an image partitioning unit 601, a motion obstacle confidence calculating unit 602, a first block obstacle detecting unit 603 and an obstacle determining unit 604.

The image partitioning unit 601 is adapted to acquire a current frame and N previous frames that immediately precede the current frame, and partition the obtained frames in the same manner, so that each of the frames is partitioned into a plurality of blocks.

The motion obstacle confidence calculating unit 602 is adapted to calculate a motion obstacle confidence for each of the blocks of the current frame and the N previous frames that immediately precede the current frame.

The first block obstacle detecting unit 603 is adapted to determine in an order, for each of the blocks of the current frame, whether the block is an obstacle, according to the motion obstacle confidences of the blocks of the current frame and the N previous frames that immediately precede the current frame.

The obstacle determining unit 604 is adapted to determine the obstacle in the image according to each of the blocks.

The motion obstacle confidence calculating unit 602 may be the same as the motion obstacle confidence calculating unit 502 in FIG. 5, and include: a hypothetical image generating unit, a first motion confidence calculating unit, a second motion confidence calculating unit and a motion obstacle confidence determining unit. Detailed descriptions are omitted here.

The first block obstacle detecting unit 603 may include:

a first total confidence determining unit, adapted to determine, for a block, if the number of the motion obstacle confidences of the block in the current frame and in the N previous frames that are 1 is greater than a first amount threshold, that a total confidence C_Total of the block of the current frame is 1, otherwise determine that the total confidence C_Total of the block is 0; and a first detecting unit, adapted to determine, if the total confidence C_Total of the block of the current frame is 1, that the block is an obstacle, otherwise determine that the block is not an obstacle.

Compared with the conventional method which is based solely on motion compensation, the other method and apparatus for detecting an obstacle in an image according to the embodiments of the present invention use both an absolute level of motion compensation and a relative level of motion compensation, as well as a characteristic analysis strategy, which may further reduce error detection and improve accuracy in detecting obstacles in images.

It is appreciable by those skilled in the art that, all or some of the steps described in the method embodiments herein can be implemented by a program instructing relating hardware, with the program stored in a computer-readable medium, e.g., ROM/RAM, magnetic disk, or optical disc.

Preferred embodiments of the present invention are described above, which shall not be interpreted as limiting the scope the invention. Any modifications, equivalents, improvements and the like within the spirit and principle of the invention should be included in the scope of the invention.

The invention claimed is:

1. A method for detecting an obstacle in an image, comprising:
   acquiring a current frame and N previous frames that immediately precede the current frame, and partitioning the obtained frames in the same manner, so that each of the frames is partitioned into a plurality of blocks;
   calculating a motion obstacle confidence for each of the blocks of the current frame and the N previous frames that immediately precede the current frame;
   determining in an order, for each of the blocks of the current frame, whether the block is an obstacle, according to the motion obstacle confidences of the blocks of the current frame and the N previous frames that immediately precede the current frame; and
   determining the obstacle in the image according to each of the blocks.

2. The method according to claim 1, wherein the step of calculating a motion obstacle confidence for each of the blocks of the current frame comprises:

i) acquiring a motion parameter, and generating a hypothetical current frame that corresponds to a previous frame at time n−k, where n>=2 and k>=1;

ii) for a block, calculating similarity between the block in the current frame and in the hypothetical frame, to obtain a first motion confidence C_M_A1;

iii) for the block, calculating similarity between the block in the current frame and in the previous frame at time n−k, to obtain a second motion confidence C_M_A2;

iv) for the block, if the first motion confidence C_M_A1 is greater than a first motion threshold, and if the ratio of the first motion confidence C_M_A1 to the second motion confidence C_M_A2 is greater than a second motion threshold, then the motion obstacle confidence C_M of the block of the current frame is 1, otherwise the motion obstacle confidence C_M of the block of the current frame is 0; and v) repeating steps ii) to iv), to obtain the motion obstacle confidence of each of the blocks.

3. The method according to claim 2, wherein the step of determining for each of the blocks of the current frame whether the block is an obstacle comprises:

for a block, if the number of the motion obstacle confidences of the block in the current frame and in the N previous frames that are 1 is greater than a first amount threshold, then a total confidence C_Total of the block of the current frame is 1, otherwise the total confidence C_Total of the block is 0; and if the total confidence C_Total of the block of the current frame is 1, then the block is an obstacle, otherwise the block is not an obstacle.

4. A method for detecting an obstacle in an image, comprising:

acquiring a current frame and N previous frames that immediately precede the current frame, and partitioning the obtained frames in the same manner, so that each of the frames is partitioned into a plurality of blocks;

calculating a motion obstacle confidence and a characteristic obstacle confidence for each of the blocks of the current frame and the N previous frames that immediately precede the current frame;

determining in an order, for each of the blocks of the current frame, whether the block is an obstacle, according to the motion obstacle confidences and the characteristic obstacle confidence of the blocks of the current frame and the N previous frames that immediately precede the current frame; and determining the obstacle in the image according to each of the blocks.

5. The method according to claim 4, wherein the step of calculating a motion obstacle confidence for each of the blocks of the current frame comprises:

i) acquiring a motion parameter, and generating a hypothetical current frame that corresponds to a previous frame at time n−k, where n>=2 and k>=1;

ii) for a block, calculating similarity between the block in the current frame and in the hypothetical frame, to obtain a first motion confidence C_M_A1;

iii) for the block, calculating similarity between the block in the current frame and in the previous frame at time n−k, to obtain a second motion confidence C_M_A2;

iv) for the block, if the first motion confidence C_M_A1 is greater than a first motion threshold, and if the ratio of the first motion confidence C_M_A1 to the second motion confidence C_M_A2 is greater than a second motion threshold, then the motion obstacle confidence C_M of the block of the current frame is 1, otherwise the motion obstacle confidence C_M of the block of the current frame is 0; and v) repeating steps ii) to iv), to obtain the motion obstacle confidence of each of the blocks.

6. The method according to claim 4, wherein the characteristic obstacle confidence comprises a vertical feature-based characteristic obstacle confidence or a texture feature-based characteristic obstacle confidence.

7. The method according to claim 6, wherein the step of calculating a characteristic obstacle confidence for each of the blocks of the current frame based on their vertical features comprises:

a) determining whether a block of the current frame has a vertical feature; and if so, the characteristic obstacle confidence C_F of the block of the current frame is 1, otherwise the characteristic obstacle confidence C_F of the block of the current frame is 0; and b) repeating step a), to obtain the characteristic obstacle confidence of each of the blocks.

8. The method according to claim 7, wherein the step of determining whether a block of the current frame has a vertical feature comprises:

a01) calculating a vertical direction intensity $I_v$ of the block:

$$I_V = \sum_{i=0}^{N} \sum_{j=0}^{M} |c_{i,j} - c_{i,j-k}|, 1 \le k < j$$

where $c_{i,j}$ is the grayscale value of a pixel at row i and column j of the current frame, k is an integer, i, j∈R, with R being the block, N is the width of the image, and M is the height of the image; and a02) if the vertical direction intensity $I_v$ according to step a01) is greater than an intensity threshold, then it is determined that the block has a vertical feature, otherwise it is determined that the block does not have a vertical feature.

9. The method according to claim 7, wherein the step of determining for each of the blocks of the current frame whether the block is an obstacle comprises:

for a block, if the number of the motion obstacle confidences of the block in the current frame and in the N previous frames that are 1 is greater than a first amount threshold, and if the number of the characteristic obstacle confidences of the block in the current frame and in the N previous frames that are 1 is greater than a second amount threshold, then a total confidence C_Total of the block of the current frame is 1, otherwise the total confidence C_Total of the block is 0; and if the total confidence C_Total of the block of the current frame is 1, then the block is an obstacle, otherwise the block is not an obstacle.

10. An apparatus for detecting an obstacle in an image, comprising:

an image partitioning unit, adapted to acquire a current frame and N previous frames that immediately precede the current frame, and partition the obtained frames in the same manner, so that each of the frames is partitioned into a plurality of blocks;

a motion obstacle confidence calculating unit, adapted to calculate a motion obstacle confidence for each of the blocks of the current frame and the N previous frames that immediately precede the current frame;

a first block obstacle detecting unit, adapted to determine in an order, for each of the blocks of the current frame, whether the block is an obstacle, according to the motion obstacle confidences of the blocks of the current frame and the N previous frames that immediately precede the current frame; and an obstacle determining unit, adapted to determine the obstacle in the image according to each of the blocks.

11. The apparatus according to claim 10, wherein the motion obstacle confidence calculating unit comprises:
a hypothetical image generating unit, adapted to acquire a motion parameter, and generate a hypothetical current frame that corresponds to a previous frame at time n−k, where n>=2 and k>=1;
a first motion confidence calculating unit, adapted to calculate, for a block, similarity between the block in the current frame and in the hypothetical frame, to obtain a first motion confidence C_M_A1;
a second motion confidence calculating unit, adapted to calculate, for the block, similarity between the block in the current frame and in the previous frame at time n−k, to obtain a second motion confidence C_M_A2; and
a motion obstacle confidence determining unit, adapted to determine, if the first motion confidence C_M_A1 is greater than a first motion threshold and if the ratio of the first motion confidence C_M_A1 to the second motion confidence C_M_A2 is greater than a second motion threshold, that the motion obstacle confidence C_M of the block of the current frame is 1, otherwise determine that the motion obstacle confidence C_M of the block of the current frame is 0.

12. The apparatus according to claim 10, wherein the first block obstacle detecting unit comprises:
a first total confidence determining unit, adapted to determine, for a block, if the number of the motion obstacle confidences of the block in the current frame and in the N previous frames that are 1 is greater than a first amount threshold, that a total confidence C_Total of the block of the current frame is 1, otherwise determine that the total confidence C_Total of the block is 0; and
a first detecting unit, adapted to determine, if the total confidence C_Total of the block of the current frame is 1, that the block is an obstacle, otherwise determine that the block is not an obstacle.

13. An apparatus for detecting an obstacle in an image, comprising:
an image partitioning unit, adapted to acquire a current frame and N previous frames that immediately precede the current frame, and partition the obtained frames in the same manner, so that each of the frames is partitioned into a plurality of blocks;
a motion obstacle confidence calculating unit, adapted to calculate a motion obstacle confidence for each of the blocks of the current frame and the N previous frames that immediately precede the current frame;
a characteristic obstacle confidence calculating unit, adapted to calculate a characteristic obstacle confidence for each of the blocks of the current frame and the N previous frames that immediately precede the current frame;
a second block obstacle detecting unit, adapted to determine in an order, for each of the blocks of the current frame, whether the block is an obstacle, according to the motion obstacle confidences and the characteristic obstacle confidence of the blocks of the current frame and the N previous frames that immediately precede the current frame; and an obstacle determining unit, adapted to determine the obstacle in the image according to each of the blocks.

14. The apparatus according to claim 13, wherein the motion obstacle confidence calculating unit comprises:
a hypothetical image generating unit, adapted to acquire a motion parameter, and generate a hypothetical current frame that corresponds to a previous frame at time n−k, where n>=2 and k>=1;
a first motion confidence calculating unit, adapted to calculate, for a block, similarity between the block in the current frame and in the hypothetical frame, to obtain a first motion confidence C_M_A1;
a second motion confidence calculating unit, adapted to calculate, for the block, similarity between the block in the current frame and in the previous frame at time n−k, to obtain a second motion confidence C_M_A2; and
a motion obstacle confidence determining unit, adapted to determine, if the first motion confidence C_M_A1 is greater than a first motion threshold and if the ratio of the first motion confidence C_M_A1 to the second motion confidence C_M_A2 is greater than a second motion threshold, that the motion obstacle confidence C_M of the block of the current frame is 1, otherwise determine that the motion obstacle confidence C_M of the block of the current frame is 0.

15. The apparatus according to claim 13, wherein the characteristic obstacle confidence comprises a vertical feature-based characteristic obstacle confidence, a vertical edge feature-based characteristic obstacle confidence, or a texture feature-based characteristic obstacle confidence.

16. The apparatus according to claim 15, wherein when the characteristic obstacle confidence is based on a vertical feature, the characteristic obstacle confidence calculating unit comprises:
a vertical feature determining unit, adapted to determine whether a block of the current frame has a vertical feature and notify a characteristic obstacle confidence determining unit of a determination result; and
the characteristic obstacle confidence determining unit, adapted to determine, if it is notified of the block of the current frame having a vertical feature, that the characteristic obstacle confidence C_F of the block of the current frame is 1, otherwise determine that the characteristic obstacle confidence C_F of the block of the current frame is 0.

17. The apparatus according to claim 13, wherein the second block obstacle detecting unit comprises:
a second total confidence determining unit, adapted to determine, for a block, if the number of the motion obstacle confidences of the block in the current frame and in the N previous frames that are 1 is greater than a first amount threshold, and if the number of the characteristic obstacle confidences of the block in the current frame and in the N previous frames that are 1 is greater than a second amount threshold, that a total confidence C_Total of the block of the current frame is 1, otherwise determine that the total confidence C_Total of the block is 0; and
a second detecting unit, adapted to determine, if it is notified of the total confidence C_Total of the block of the current frame being 1, that the block is an obstacle, otherwise determine that the block is not an obstacle.

* * * * *